(12) United States Patent  
Sham

(10) Patent No.: US 10,454,564 B2
(45) Date of Patent: Oct. 22, 2019

(54) FACILITATING COMMUNICATION WITH A VEHICLE VIA A UAV

(71) Applicant: Wellen Sham, Taipei (TW)

(72) Inventor: Wellen Sham, Taipei (TW)

(73) Assignee: Wellen Sham, Taipei (TW)

( * ) Notice: Subject to any disclaimer, the term of this patent is extended or adjusted under 35 U.S.C. 154(b) by 0 days.

(21) Appl. No.: 15/685,465

(22) Filed: Aug. 24, 2017

(65) Prior Publication Data

US 2017/0353229 A1     Dec. 7, 2017

Related U.S. Application Data

(63) Continuation of application No. 15/341,809, filed on Nov. 2, 2016, now Pat. No. 9,800,321.

(60) Provisional application No. 62/274,112, filed on Dec. 31, 2015.

(51) Int. Cl.
    *H04B 7/185*     (2006.01)
    *H04W 72/04*     (2009.01)
    *H04L 29/08*     (2006.01)

(52) U.S. Cl.
    CPC ......... *H04B 7/18504* (2013.01); *H04B 7/185* (2013.01); *H04L 67/12* (2013.01); *H04W 72/04* (2013.01); *H04B 7/18506* (2013.01)

(58) Field of Classification Search
    CPC ..... H04B 7/18504; H04L 67/12; H04W 72/04
    See application file for complete search history.

(56) References Cited

U.S. PATENT DOCUMENTS

| 6,958,676 B1 | 10/2005 | Morgan et al. |
| 7,885,548 B1 | 2/2011 | Nelson et al. |
| 8,503,941 B2 | 8/2013 | Erdos et al. |
| 8,527,146 B1 | 9/2013 | Jackson et al. |
| 8,717,436 B2 | 5/2014 | Heminghous et al. |
| 8,970,694 B2 | 3/2015 | Dunkel et al. |
| 9,022,324 B1 | 5/2015 | Abhyanker |
| 9,056,676 B1 * | 6/2015 | Wang ................... B64F 1/00 |

(Continued)

FOREIGN PATENT DOCUMENTS

WO     2010/089738 A2     8/2010

OTHER PUBLICATIONS

European Search Report for EP 16 20 6286 dated May 24, 2017, 7 pages.

(Continued)

*Primary Examiner* — Rasheed Gidado
(74) *Attorney, Agent, or Firm* — Kilpatrick Townsend & Stockton LLP

(57) ABSTRACT

Embodiments are provided for facilitating communications with a vehicle through an unmanned aerial vehicle (UAV). The UAV can be configured to track vehicles traveling in an area covered by the UAV. An identification of the vehicle can be acquired after the vehicle is tracked by the UAV. The vehicle identification can be used to determine communication capability of the vehicle. Based on the determined communication capability of the vehicle, a communication request can be initiated by the UAV. The vehicle can determine either accept the communication request from the UAV or turn it down. If the vehicle accepts the communication request from the UAV, information intended for the vehicle, for example from another vehicle, can be forwarded to the vehicle by the UAV.

18 Claims, 9 Drawing Sheets

(56) References Cited

U.S. PATENT DOCUMENTS

| | | | |
|---|---|---|---|
| 9,070,289 B2 | 6/2015 | Saund et al. | |
| 9,148,215 B1 | 9/2015 | Bonawitz | |
| 9,164,506 B1 * | 10/2015 | Zang | G05D 1/0038 |
| 9,170,117 B1 | 10/2015 | Abuelsaad et al. | |
| 9,307,383 B1 | 4/2016 | Patrick | |
| 9,313,242 B2 | 4/2016 | Mann et al. | |
| 9,313,667 B1 | 4/2016 | Daoura | |
| 9,466,161 B2 | 10/2016 | Ricci | |
| 9,489,839 B2 * | 11/2016 | Nerayoff | G06Q 20/145 |
| 9,590,298 B1 | 3/2017 | Buchmueller et al. | |
| 9,786,165 B2 | 10/2017 | Sham | |
| 9,800,321 B2 | 10/2017 | Sham | |
| 9,826,256 B2 | 11/2017 | Sham | |
| 9,955,115 B2 | 4/2018 | Sham | |
| 10,073,449 B1 | 9/2018 | Sait | |
| 10,097,862 B2 | 10/2018 | Sham | |
| 2003/0200398 A1 | 10/2003 | Harris | |
| 2007/0080813 A1 | 4/2007 | Melvin | |
| 2007/0250260 A1 | 10/2007 | Ariyur et al. | |
| 2008/0018730 A1 | 1/2008 | Roth | |
| 2008/0024985 A1 | 1/2008 | Lee et al. | |
| 2008/0249857 A1 | 10/2008 | Angell et al. | |
| 2010/0031284 A1 | 2/2010 | Miyaki | |
| 2010/0036717 A1 | 2/2010 | Trest | |
| 2010/0085236 A1 | 4/2010 | Franceschini et al. | |
| 2010/0179878 A1 | 7/2010 | Dawson et al. | |
| 2010/0293033 A1 | 11/2010 | Hall et al. | |
| 2011/0292160 A1 | 12/2011 | Shitrit | |
| 2012/0054028 A1 | 3/2012 | Tengler et al. | |
| 2012/0089462 A1 | 4/2012 | Hot | |
| 2012/0122418 A1 | 5/2012 | Hicks, III | |
| 2013/0210461 A1 | 8/2013 | Moldavsky et al. | |
| 2013/0273839 A1 | 10/2013 | Breshears | |
| 2013/0317680 A1 | 11/2013 | Yamamura et al. | |
| 2013/0328997 A1 | 12/2013 | Desai | |
| 2014/0241239 A1 | 8/2014 | Chang | |
| 2014/0309806 A1 | 10/2014 | Ricci | |
| 2014/0309813 A1 | 10/2014 | Ricci | |
| 2014/0336848 A1 | 11/2014 | Saund et al. | |
| 2014/0344062 A1 | 11/2014 | LaMont | |
| 2015/0049192 A1 | 2/2015 | Hooton | |
| 2015/0062339 A1 | 3/2015 | Ostrom | |
| 2015/0070516 A1 | 3/2015 | Shoemake et al. | |
| 2015/0092020 A1 | 4/2015 | Vaughn | |
| 2015/0127460 A1 | 5/2015 | Daub et al. | |
| 2015/0134143 A1 | 5/2015 | Willenborg | |
| 2015/0140954 A1 | 5/2015 | Maier et al. | |
| 2015/0146579 A1 | 5/2015 | Teller et al. | |
| 2015/0204974 A1 | 7/2015 | Pillay | |
| 2015/0257081 A1 | 9/2015 | Ramanujan et al. | |
| 2015/0280810 A1 | 10/2015 | Beals et al. | |
| 2015/0325268 A1 | 11/2015 | Berger et al. | |
| 2015/0353206 A1 | 12/2015 | Wang | |
| 2016/0019458 A1 | 1/2016 | Kaufhold | |
| 2016/0078759 A1 | 3/2016 | Nerayoff et al. | |
| 2016/0116291 A1 | 4/2016 | Chien | |
| 2016/0199034 A1 | 7/2016 | Labyed et al. | |
| 2016/0271796 A1 | 9/2016 | Babu | |
| 2016/0272196 A1 | 9/2016 | Hocking et al. | |
| 2016/0285864 A1 * | 9/2016 | Canavor | H04L 63/0823 |
| 2016/0363929 A1 * | 12/2016 | Clark | G05D 1/0011 |
| 2017/0019504 A1 | 1/2017 | Ota et al. | |
| 2017/0039424 A1 | 2/2017 | Nerayoff et al. | |
| 2017/0041763 A1 | 2/2017 | Jalali | |
| 2017/0193556 A1 | 7/2017 | Sham | |
| 2017/0193820 A1 | 7/2017 | Sham | |
| 2017/0195038 A1 | 7/2017 | Sham | |
| 2017/0195048 A1 | 7/2017 | Sham | |
| 2017/0195627 A1 | 7/2017 | Sham | |
| 2017/0195694 A1 | 7/2017 | Sham | |
| 2017/0353229 A1 | 12/2017 | Sham | |
| 2018/0033298 A1 | 2/2018 | Sham | |
| 2018/0063554 A1 | 3/2018 | Sham | |

OTHER PUBLICATIONS

European Search Report for EP 16 20 6298 dated May 24, 2017, 7 pages.
European Search Report for EP 16 20 6328 dated May 29, 2017, 6 pages.
European Search Report for EP 16 20 6338 dated Jun. 6, 2017, 6 pages.
European Search Report for EP 16 20 6345 dated May 29, 2017, 8 pages.
European Search Report for EP 16 20 6351 dated Jun. 9, 2017, 6 pages.
U.S. Appl. No. 15/341,797, filed Nov. 2, 2016, Non-Final Rejection dated Jan. 27, 2017, all pages.
U.S. Appl. No. 15/341,797, filed Nov. 2, 2016, Final Rejection dated May 10, 2017, all pages.
U.S. Appl. No. 15/341,809, filed Nov. 2, 2016, Non-Final Rejection dated Dec. 30, 2016, all pages.
U.S. Appl. No. 15/341,809, filed Nov. 2, 2016, Notice of Allowance dated Jun. 16, 2017, all pages.
U.S. Appl. No. 15/341,813, filed Nov. 2, 2016, Non-Final Rejection dated Jan. 31, 2017, all pages.
U.S. Appl. No. 15/341,813, filed Nov. 2, 2016, Final Rejection dated Aug. 29, 2017, all pages.
U.S. Appl. No. 15/341,818, filed Nov. 2, 2016, Non-Final Rejection dated Jan. 27, 2017, all pages.
U.S. Appl. No. 15/341,818, filed Nov. 2, 2016, Final Rejection dated Aug. 10, 2017, all pages.
U.S. Appl. No. 15/341,824, filed Nov. 2, 2016, Non-Final Rejection dated Mar. 16, 2017, all pages.
U.S. Appl. No. 15/341,824, filed Nov. 2, 2016, Notice of Allowance dated Jul. 18, 2017, all pages.
U.S. Appl. No. 15/341,831, filed Nov. 2, 2016, Non-Final Rejection dated Jan. 13, 2017, all pages.
U.S. Appl. No. 15/341,831, filed Nov. 2, 2016, Notice of Allowance dated May 23, 2017, all pages.
U.S. Appl. No. 15/341,797, filed Nov. 2, 2016, Non-Final Rejection dated Dec. 14, 2017, all pages.
Notice of Allowance dated Jun. 7, 2018 in the corresponding U.S. Appl. No. 15/794,529.
Final Office Action dated May 23, 2018 in the corresponding U.S. Appl. No. 15/341,797.
U.S. Appl. No. 15/341,797, "Advisory Action", dated Sep. 11, 2018, 3 pages.
U.S. Appl. No. 15/341,797, "Final Office Action", dated Sep. 5, 2017, 15 pages.
U.S. Appl. No. 15/341,797, "Final Office Action", dated Feb. 26, 2019, 17 pages.
U.S. Appl. No. 15/341,797, "Non-Final Office Action", dated Sep. 19, 2018, 14 pages.
U.S. Appl. No. 15/341,809, "Supplemental Notice of Allowance", dated Jul. 13, 2017, 2 pages.
U.S. Appl. No. 15/341,813, "Notice of Allowance", dated Dec. 13, 2017, 6 pages.
U.S. Appl. No. 15/341,818, "Final Office Action", dated Aug. 10, 2018, 31 pages.
U.S. Appl. No. 15/341,818, "Non-Final Office Action", dated Jan. 9, 2018, 21 pages.
U.S. Appl. No. 15/341,818, "Non-Final Office Action", dated Dec. 26, 2018, 30 pages.
U.S. Appl. No. 15/717,483, "Non-Final Office Action", dated Nov. 2, 2018, 7 pages.
U.S. Appl. No. 15/717,483, "Notice of Allowance", dated Mar. 14, 2019, 9 pages.
U.S. Appl. No. 15/926,486, "Ex Parte Quayle Action", Jan. 28, 2019, 9 pages.

* cited by examiner

FACILITATING COMMUNICATION WITH A VEHICLE VIA A UAV

CROSS-REFERENCE TO RELATED APPLICATIONS

The present application is a continuation of U.S. Nonprovisional application Ser. No. 15/341,809, filed Nov. 2, 2016, which claims priority to U.S. Provisional Application No. 62/274,112, filed on Dec. 31, 2015, the disclosure of which is hereby incorporated by reference in its entirety for all purposes.

The present application is related to the following co-pending U.S. Nonprovisional patent applications: U.S. Nonprovisional application Ser. No. 15/341,813, filed Nov. 2, 2016; U.S. Nonprovisional application Ser. No. 15/341,818, filed Nov. 2, 2016; U.S. Nonprovisional application Ser. No. 15/341,824, filed Nov. 2, 2016; and U.S. Nonprovisional application Ser. No. 15/341,831, filed Nov. 2, 2016. The entire disclosures of each of these applications are hereby incorporated by reference in their entireties for all purposes.

BACKGROUND

The present disclosure relates to facilitating telecommunications through unmanned aerial vehicle, and more specifically to facilitating telecommunications through self-sustaining unmanned aerial vehicle.

An unmanned aerial vehicle (UAV), commonly known as a drone and also referred by several other names, is an aircraft without a human pilot aboard. The flight of UAVs may be controlled either autonomously by onboard computers or by the remote control of a pilot on the ground or in another vehicle. UAVs have mostly found military and special operation applications, but also are increasingly finding uses in civil applications, such as policing, surveillance and firefighting, and nonmilitary security work, such as inspection of power or pipelines. UAVs are adept at gathering an immense amount of visual information and displaying it to human operators. However, it can take a great deal of time and manpower to interpret the information gathered by UAVs. In many cases, the information gathered by UAVs is misinterpreted by human operators and analysts who have a limited time window in which to interpret the information.

Cellular telecommunication protocol is generally known, such as the third or $4^{th}$ generation of mobile phone networks. Radio spectrum is a scarce resource in cellular networks. Governments license the right to use parts of the spectrum to the cellular network operators, often using a spectrum auction in which network operators submit bids. The architecture of the cellular network mainly comprises subscriber devices and base stations. The base stations implement air interfaces with the subscriber devices. For many rural areas, the coverage of base stations provided by the telecommunication operators do not reach those areas.

SUMMARY

Embodiments are provided for facilitating communications with a vehicle through an unmanned aerial vehicle (UAV). The UAV can be configured to track vehicles traveling in an area covered by the UAV. An identification of the vehicle can be acquired after the vehicle is tracked by the UAV. The vehicle identification can be used to determine communication capability of the vehicle. Based on the determined communication capability of the vehicle, a communication request can be initiated by the UAV. The vehicle can determine either accept the communication request from the UAV or turn it down. If the vehicle accepts the communication request from the UAV, information intended for the vehicle, for example from another vehicle, can be forwarded to the vehicle by the UAV.

Embodiments can provide communication protocols for communications to the vehicle via a processing station. The processing station may be configured to have a communication link with the UAV 102 that can communicate with the vehicle as described above. The processing station can be connected to a core network that provides, for example, a cellular network, a public switched telephone network (PTSN) and/or the Internet. The processing station can serve as relay point or a router for forwarding information to the vehicle via the UAV. For example, the processing station can forward information from a server to the vehicle via the UAV. The processing station can also serve as a relay point or router to communicate information from the vehicle 106 to other entities connected to the core network.

Embodiments can provide communication protocols for communications between two vehicles. Each vehicle can have a communication link with a corresponding UAV. The UAVs can be configured to communicate with each other directly or via a processing station. The vehicles can communicate with each other via the communication link established by the UAVs.

Other objects and advantages of the invention will be apparent to those skilled in the art based on the following drawings and detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

Figure 1:
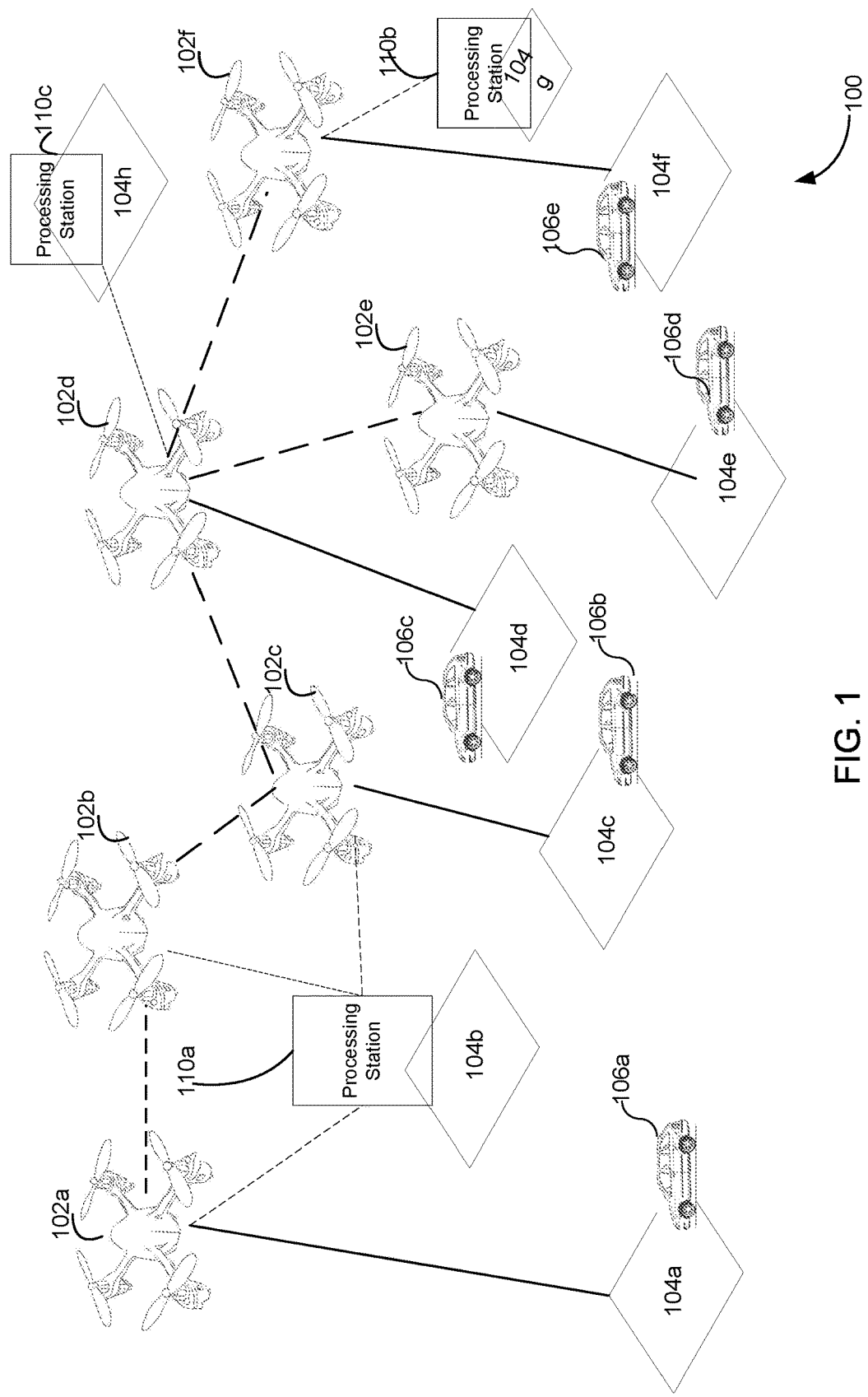
FIG. 1 illustrates an exemplary UAV network in accordance with the disclosure.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

Various specific embodiments of the present disclosure will be described below with reference to the accompanying drawings constituting a part of this specification. It should be understood that, although structural parts and components of various examples of the present disclosure are described by using terms expressing directions, e.g., "front", "back", "upper", "lower", "left", "right" and the like in the present disclosure, these terms are merely used for the purpose of convenient description and are determined on the basis of exemplary directions displayed in the accompanying drawings. Since the embodiments disclosed by the present disclosure may be set according to different directions, these terms expressing directions are merely used for describing rather than limiting. Under possible conditions, identical or similar reference numbers used in the present disclosure indicate identical components.

UAVs are well suited for applications where the payload consists of optical image sensors such as cameras with powerful lightweight sensors suited for a variety of commercial applications such as surveillance, video conferencing, vehicle positioning, and/or any other applications. A UAV in accordance with the disclosure can collect multi-spectral imagery of any object in an area covered the UAV. In certain embodiments, the UAV in accordance with the disclosure can fly up to 65,000 feet and can cover as much as 500 km in range. One motivation of the present disclosure is to employ UAVs to facilitate communications between vehicles. In certain areas, especially rural areas, deployment of cellular networks is limited due to cost and benefit considerations. In those areas, cellular coverage is often less than desirable. Communications between vehicles traveling in those areas through cellular networks is thus not reliable. Another motivation of the present disclosure is to provide an alternative wireless communication protocol to the existing ones. Mobility of a vehicle is obviously much greater than a mobile device carried by a person. When a vehicle moves out of the range of one cellular base station and into the range of another one, the flow of data must be re-routed from the old to the new cell base station. This technique is known as handover or handoff. A vehicle can quickly move in and out of a cell, which can require frequent handoff between cells. As handoff incurs overhead and does not always take place instantly as a vehicle move from one cell to another cell at a high speed, communications between two vehicles through a cellular network is not reliable. Thus, the existing cellular networks are not suitable for communications between two vehicles. While satellite communications are also possible, the cost of using satellite makes it not commercially viable for vehicle communications. Embodiments provide communication technologies to facilitate telecommunications for a moving vehicle via UAV and/or ground processing station.

FIG. 1 illustrates an exemplary UAV network 100 for facilitating communications for a an vehicle in accordance with the disclosure. As shown, the UAV network 100 can comprise multiple UAVs 102, such as UAVs 102a-f. It should be understood the UAV network 100, in certain embodiments, can comprise hundreds, thousands, or even tens of thousands of UAVs 102. The individual UAVs 102 in network 100, such as UAV 102a, can fly above the ground, between 50,000 to 65,000 feet altitude. However, this is not intended to be limiting. In some examples, some or all of the UAVs 102 in the network 100 can fly at hundreds or thousands feet above the ground. As shown, the individual UAVs 102 in the network 100 can communicate with each other through communication hardware carried by or installed on UAVs 102. For example, the communication hardware onboard a UAV 102 can include an antenna, a high frequency radio transceiver, an optical transceiver, and/or any other communication components for long range communications. A communication channel between any two given UAVs 102 in network 100, for example, UAV 102c and UAV 102d, can be established.

One way of establishing a communication channel between any two given UAVs is to have them autonomously establish the communication channel through the communication hardware onboard the two given UAVs 102. In this example, UAVs 102a, 102b and 102c are neighboring UAVs such that they cover neighboring areas 104a, 104b, and 104c respectively. They can be configured to communicate with each other once they are within a threshold distance. The threshold distance can be the maximum communication range of the transceivers onboard the UAVs 102a, 102b, and 102c. In this way, UAVs 102a, 102b, and 102c can send data to each other without an access point.

Another way of establishing a communication channel between any two given UAVs 102 in network 100 is to have them establish communication channel through a controller. As used herein, a controller may be referred to as a piece of hardware and/or software configured to control communications within network 100. The controller can be provided by a ground processing station, such as ground processing station 110a, 110b, or 110c. For instance, the controller can be implemented by a computer server housed in a ground processing station 110. In certain embodiments, the controller can be provide by a UAV 102 in the network 100. For instance, a given UAV 102, such as a unmanned helicopter or a balloon, in the network 100 can carry payloads including one or more of a processor configured to implement the controller. In any case, the controller can be configured to determine network requirements based on an application supported by network 100, and/or to perform any other operations. In implementations, control signals can be transmitted via a control link from the controller to the UAVs 102 shown in FIG. 1.

As mentioned above, an important criteria to a UAV 102 in the network is altitude. However, as the UAV 102 altitude increases, the signals emitted by UAV 102 becomes weaker. A UAV 102 flying at an altitude of 65,000 feet can cover an area up to 100 kilometers on the ground, but the signal loss can be significantly higher than would occur for a terrestrial network. Radio signals typically requires a large amount of power for transmission in long distance. On the other end, the payloads can be carried by a UAV 102 that stays in the air for an extended period of time is limited. As mentioned above, solar energy can be used to power the UAV 102. However this limits the weight of payloads that can be carried by a UAV 102 due to the limited rate at which solar irritation can be absorbed and converted to electricity.

Free-space optical communication (FSO) is an optical communication technology that transmits light in free space to wirelessly transmit data for telecommunications. Commercially available FSO systems use wave length close to visible spectrum around 850 to 1550 nm. In a basis point-to-point FSO system, two FSO transceivers can be placed on both sides of transmission path that has unobstructed line-of-sight between the two FSO transceivers. A variety of light sources can be used for the transmission of data using FSO transceivers. For example, LED and laser can be used to transmit data in a FSO system.

Lasers used in FSO systems provide extremely high bandwidths and capacity, on par with terrestrial fiber optic networks, but they also consume much less power than microwave systems. A FSO unit can be included in the payloads of a UAV 102 for communication. The FSO unit can include an optical transceiver with a laser transmitter and a receiver to provide full duplex bi-directional capability. The FSO unit can use a high-power optical source, i.e., laser, and a lens to transmit the laser beam through the atmosphere to another lens receiving the information embodied in the laser beam. The receiving lens can connect to a high-sensitivity receiver via optical fiber. The FSO unit included in a UAV 102 in accordance with the disclosure can enable optical transmission at speeds up to 10 Gbps.

Figure 2A:
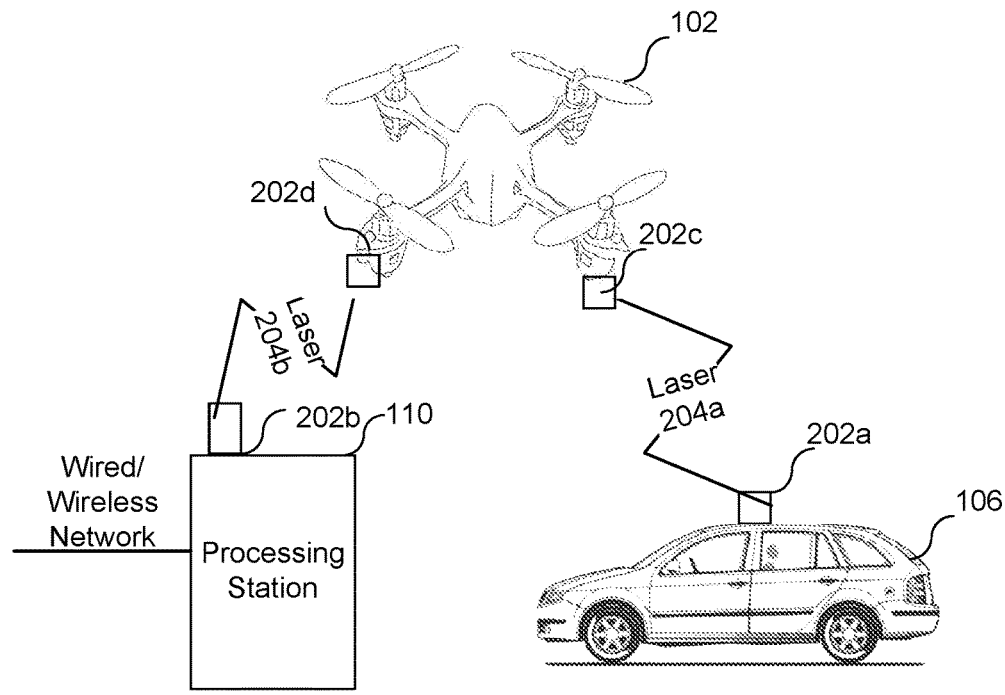
FIG. 2A illustrates one example of communications between a vehicle, a UAV and a ground processing station shown in FIG. 1.

Also shown in FIG. 1 are vehicles 106a-f. The vehicles 106 can be equipped with communication hardware. The communication hardware in a given vehicle 106 can include a FSO unit described above, a radio transceiver, and/or any other type of communication hardware. The communication hardware included in the vehicles 106 can be used to establish a communication channel between the vehicles 106 via the UAVs 102. FIG. 2A illustrates one example of communications between a vehicle 106, a UAV 102 and a ground processing station 110. As shown, the vehicle 106 can include a FSO unit 202a, which can include an optical transceiver. The optical transceiver included in the FSO unit 202a can be configured to receive laser beam 204 from UAV 102, and/or transmit the laser beam 204 to UAV 102. The UAV 102 can include one or more of a FSO unit as well. In this example, UAV 102 includes a FSO unit 202c configured to communicate with a FSO unit in a vehicle 106, and another FSO unit 202d configured to communicate with a FSO unit 202b in a ground processing station 110. However, this is not necessarily the only case. In some other examples, UAV 102 may comprise a single FSO unit configured to communicate with a FSO unit in vehicle 106 and as well as a FSO unit in ground processing station 110. In any case, in order for FSO units 202a and 202c to communicate, there should be a line of sight (LoS) between them so that laser beam 204a can be transmitted and received. The wavelength of the laser beam 204a can be between 600 nm to 2000 nm. Once the FSO units 202a and 202c are aligned with each other, optical data can be transmitted between UAV 102 and vehicle 106.

As also shown in FIG. 2A, a ground processing station 110 can include a FSO unit 202b configured to establish a communication channel FSO unit 202d through laser beam 204b. Through the communication channel, UAV 102 can be configured to communicate its geo-locations to processing station 110. Since ground processing station 110 is stationary, the geo-location of ground processing station 110 can be preconfigured into an onboard computer in UAVs 102. Through the ground processing station 110, information intended for vehicle 106 can be forwarded to vehicle 106. As shown, the ground processing station 110 can be connected to a wired or wireless network. Information intended for vehicle 106 can be communicated through the wired or wireless network from or to another entity connected to the wired or wireless network. The information intended for vehicle 106 can be first communicated to the UAV 102 through laser beam 204b, and the UAV 102 can forward the information to vehicle 106 through laser beam 204a.

Figure 2B:
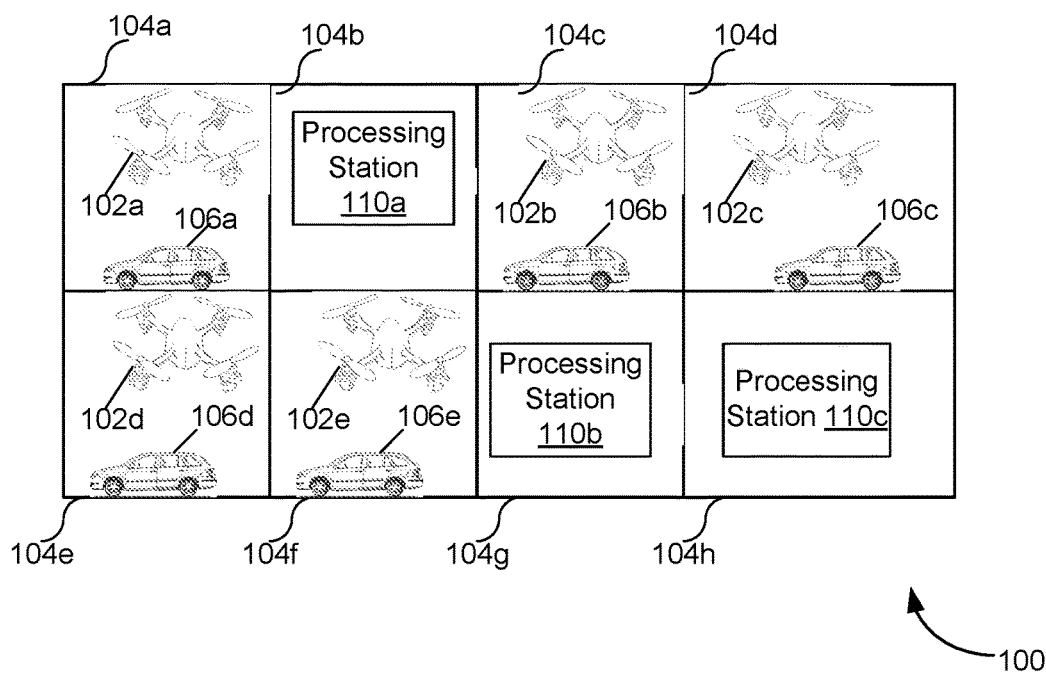
FIG. 2B illustrates a view of the network shown in FIG. 1 with respect to areas covered by UAVs.

FIG. 2B illustrates a view of network 100 with respect to areas 104 covered by UAVs 102. As shown, a given area 104, such as area 104a, 104c, 104d, 104e, 104f, can be covered by a UAV 102, such as UAV 102a-e respectively. As also shown, in certain areas 104, such as areas 104b, 104g and 104h, a processing station 110, such as processing station 110a-c can be provided. The processing station 110a-c can serve as access points for a given vehicle 106 to communicate with other vehicles and as well to access as a core network. This is illustrated in FIG. 2C.

Figure 2C:
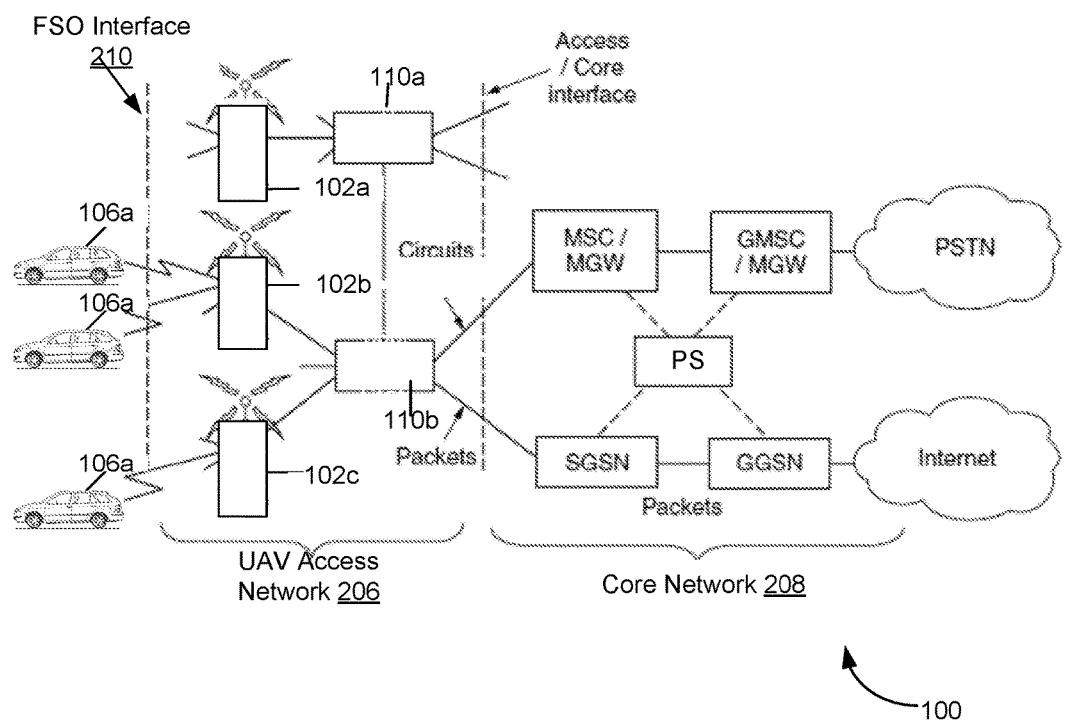
FIG. 2C illustrates another view of network shown in FIG. 1.

FIG. 2C illustrates another view of network 100. As shown, vehicles 106a-c can communicate with UAVs 102a-c via a FSO interface 210. In this example, the UAVs 102a-c are operatively connected processing stations 110a and 110b as shown. The processing stations 110 and UAVs 102 together make up UAV access network 206. The processing stations 110 can be connected to a core network 208 which can comprise a public switched telephone network (PSTN) or the Internet through a mobile switching center (MSC), a Gateway Mobile Switching center, a media gateway (MGW). As also shown, the core network 208 can include a PS (Profile Server) in the core network that registers the location of vehicles 106 and as well as locations of UAVs 102, and other profile information that is used for authentication and authorization. In this way, vehicles 106 can be found by the profile server.

Figure 3:
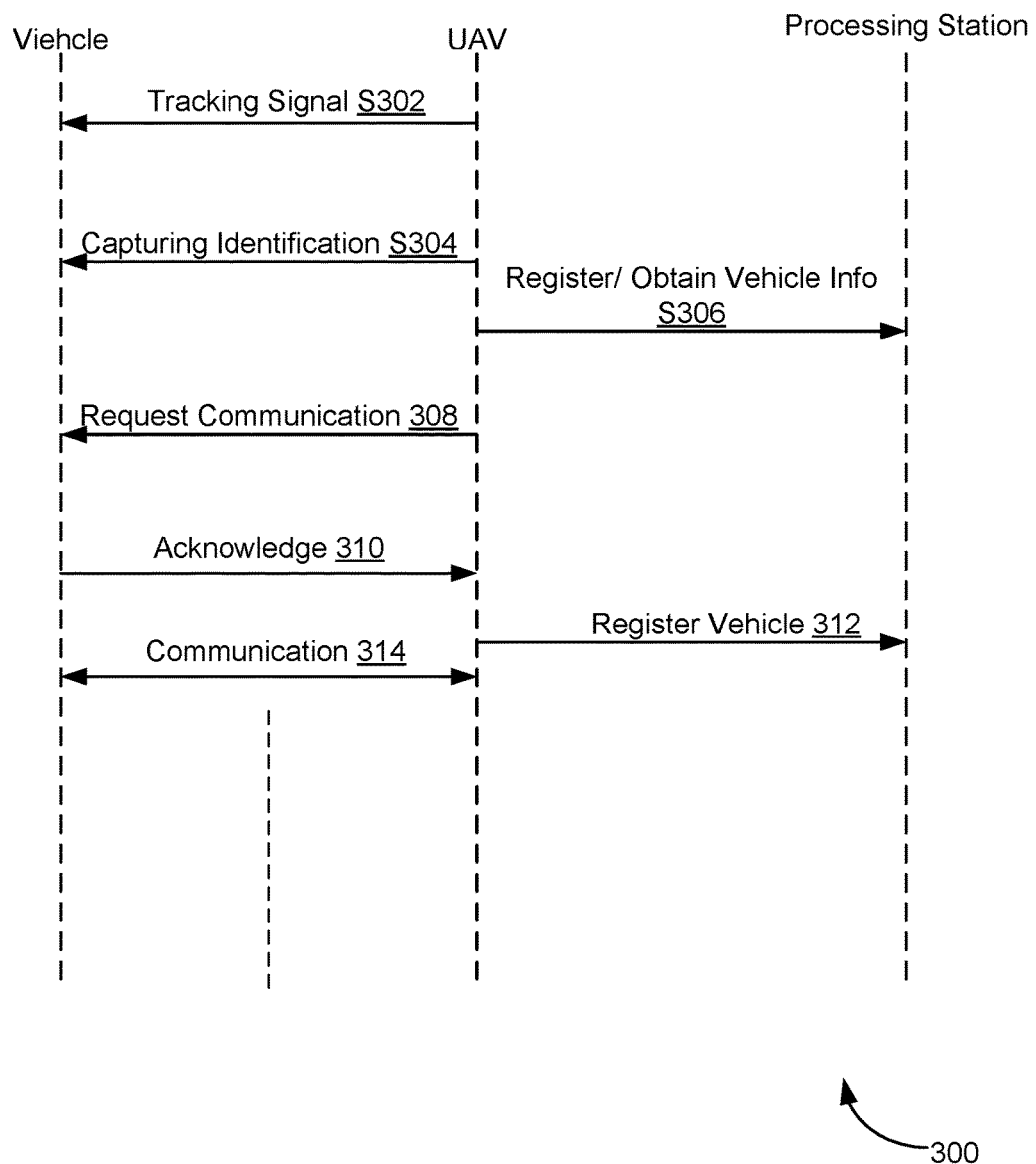
FIG. 3 illustrates one example of a communication protocol between a vehicle, a UAV, and a processing station shown in FIG. 1.

With architecture and infrastructure of network 100 having been generally described, attention is now directed to FIG. 3. FIG. 3 illustrates one example of a communication protocol between a vehicle 106, a UAV 102, and a processing station 110. As shown, at S302, a tracking signal can be transmitted from UAV 102 for tracking vehicle 106. The tracking signal can be in various forms. For example, the UAV 102 may scan the covered area 104 with a camera aboard UAV 102 in a pre-determined pattern. For example, the UAV 102 may scan the covered area 104 in a scan line fashion from on one corner of the covered area 104 to the opposite corner of the covered area 104. As another example, the UAV 102 may scan the covered area 104 in a concentric sphere fashion starting from an outer sphere within the covered area 104, gradually into inner spheres within the covered area 104 until the center of the covered area 104. Still as another example, the UAV 102 may scan the covered area along predefined lines of areas 104, for example a portion of a road that enters area 104 and another portion of the road that exits area 104. In certain embodiments, the UAV 102 may carry a radio transmitter configured to broadcast in radio signals within the covered area 104. In those examples, the broadcast radio signals can serve as tracking signals such that once they are intercepted by a vehicle 106 passing through the covered area 104, the UAV 102 can be configured to location a position of the vehicle 106 within the covered area 104.

At S304, an identification of the vehicle 106 can be captured after the vehicle 106 has been tracked by UAV 102. In certain implementations, the identification of the vehicle 106 can be captured by a camera carried by the UAV 102. For example, the UAV 102 may be configured to capture a picture of a license plate of vehicle 106 once it has been tracked. As another example, the UAV 102 may be configured to transmit a request to vehicle 106 to inquire about its identification, and the vehicle 106 can send its identification to the UAV 102 in response to the request.

At S306, information regarding the vehicle 106 can be obtained and/or registered. In certain implementations, once the identification of vehicle 106 is captured by UAV 102 at S304, the UAV 102 can obtain information regarding the vehicle 106, for example, from the profile server via the processing station 110 as shown in FIG. 2C. For instance, the UAV 102 can transmit the identification of the vehicle 106 to the profile server and the profile server can look the vehicle 106 up based on identification received. The profile server, in that example, can provide the vehicle information regarding the vehicle 106 to UAV 102 once it finds a match. The information regarding vehicle 106 can include information regarding communication capability of vehicle 106, such as one or more communication hardware carried by the vehicle. The information regarding vehicle 106 can include information indicating a model, type, make, and/or any other information regarding a type of the vehicle 106. Such information may be used to by UAV 102 to assist its communication with vehicle 106.

In certain embodiments, UAV 102 can be configured to register the vehicle 106 with the profile server when no information regarding vehicle 106 is obtained from the profile server. For example, UAV 102 may provide the identification information regarding vehicle 106 to the profile server to have the profile server to establish a record for vehicle 106 and obtain information regarding vehicle 106.

At S308, UAV 102 can initiate a request to communicate with vehicle 106 based on the information obtained at S306. For example, the UAV 102 can send a handshake message to vehicle 106 via the FSO units 202a and 202b shown FIG. 2 to request the vehicle 106 to establish a communication channel between vehicle 106 and UAV 102. In certain implementations, UAV 102 can include checksums in the handshake message.

At S310, vehicle 106 can send an acknowledge message back to UAV 102 in response to receiving the handshake message transmitted at S308. In some implementations, vehicle 106 can determine if the handshake message transmitted at S308 is damaged by computing the checksums embedded in the handshake message. In those implementations, if vehicle 106 determines that the handshake message has been received without any data loss or being damaged, it can send an acknowledgment to UAV 102 acknowledging that the handshake message has been received without error. If vehicle 106 determines that the received handshake message is damaged, it can send an acknowledgement to the UAV 102 requesting the UAV 102 to resend the handshake message. This process can be repeated until the handshake message is received at vehicle 106 without error.

At S312, vehicle 106 can be registered to indicate a communication link is established with vehicle 106. For example, the registration can made at the profile server shown in FIG. 2C. At S314, a communication channel can be established between UAV 102 and vehicle 106.

Figure 4:
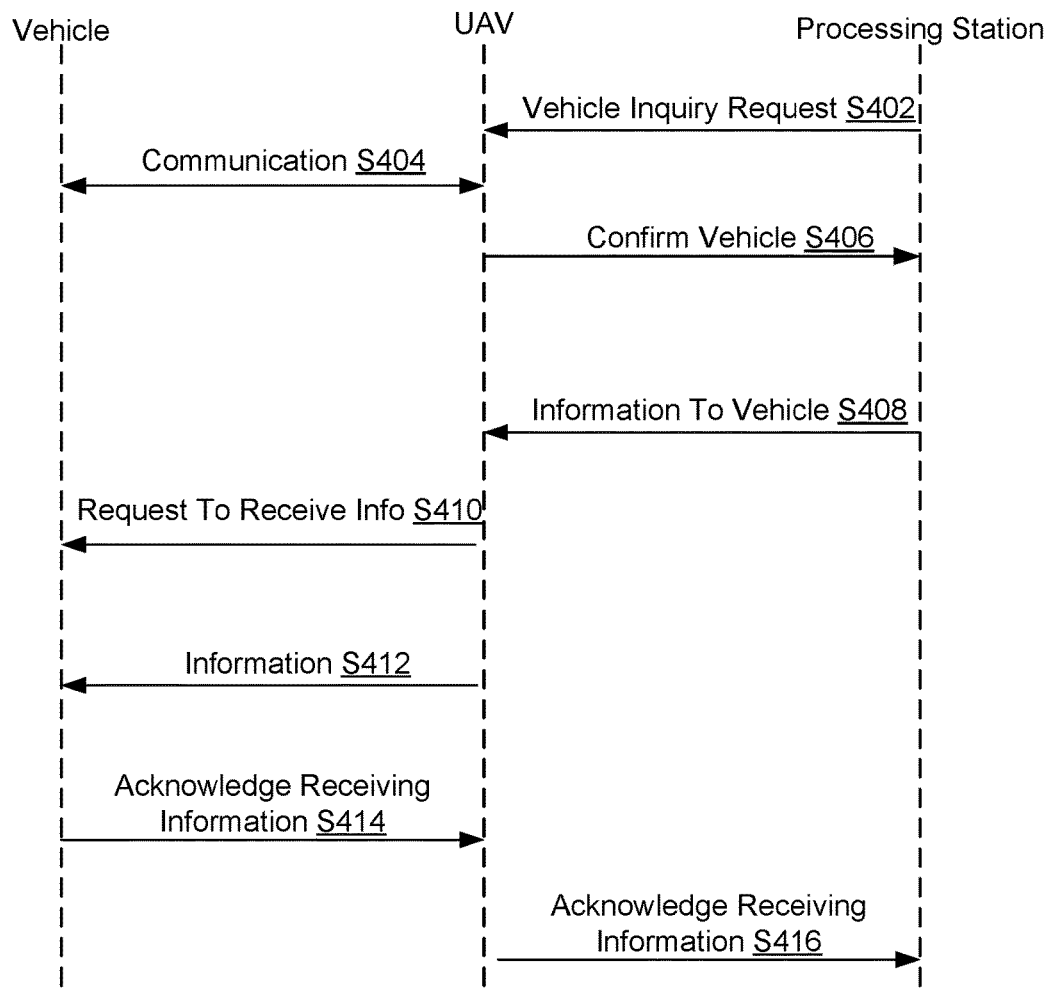
FIG. 4 illustrates another example of a communication protocol that can be used to communicate information to a given vehicle via a UAV and a processing station shown in FIG. 1.

FIG. 4 illustrates one example of a communication protocol that can be used to communicate information to a given vehicle 106 via UAV 102 and processing station 110. As shown, at S402, an inquiry request regarding vehicle 106 can be communicated from processing station 110 to UAV 102. The inquiry request can be generated when the processing station 110 receives a communication request from another vehicle 106 to communicate with the given vehicle 106. The inquiry request transmitted at S402 can serve as an instruction that instructs UAV 102 to verify whether the given vehicle 106 is available for communication. In implementations, the processing station 110 may communicate the inquiry request to UAV 102 based on a routing table indicating that the UAV 102 can establish a communication link with the given vehicle 106.

At S404, communications can be established between UAV 102 and the given vehicle 106. For example, the communications between UAV 102 and the given vehicle 106 can be established using the protocol illustrated in FIG. 3.

At S406, the UAV 102 can send a message to processing station 110 to confirm that the given vehicle 106 is available for communication. The confirmation communicated by the UAV 102 at S406 can be performed after the communication between vehicle 106 and UAV 102 is established.

At S408, information communicated from another UAV 102 can be transmitted to the UAV 102. As mentioned above, the processing station may serve as a relay point or router for another UAV 102 to communicate the information 102 to the given vehicle 106. The communication at S408 can be performed in response to the confirmation received from UAV 102 at S406.

At S410, a request for the given vehicle 106 to receive the information communicated from processing station 110 at S408 can be transmitted to UAV 102. The request transmitted at S410 can serve as a probing message to probe whether the given vehicle 106 has capacity left to receive the information communicated from another UAV 102. For example, the given vehicle 106 may not always have capacity to process the information communicated from another UAV 102, or the given vehicle 106 may be set to a mode in which not incoming information is to be received.

At S412, the information from another vehicle 106 can be forwarded to the given vehicle 106 from UAV 102. At S414, acknowledgement can be transmitted from the given vehicle 106 to UAV 102 indicating that the information transmitted to the given vehicle 106 at S412 is received by the given vehicle 106. At S416, the acknowledgement received by UAV 102 can be forwarded to processing station 110, which can forward the acknowledgement to another vehicle 106.

Figure 5:
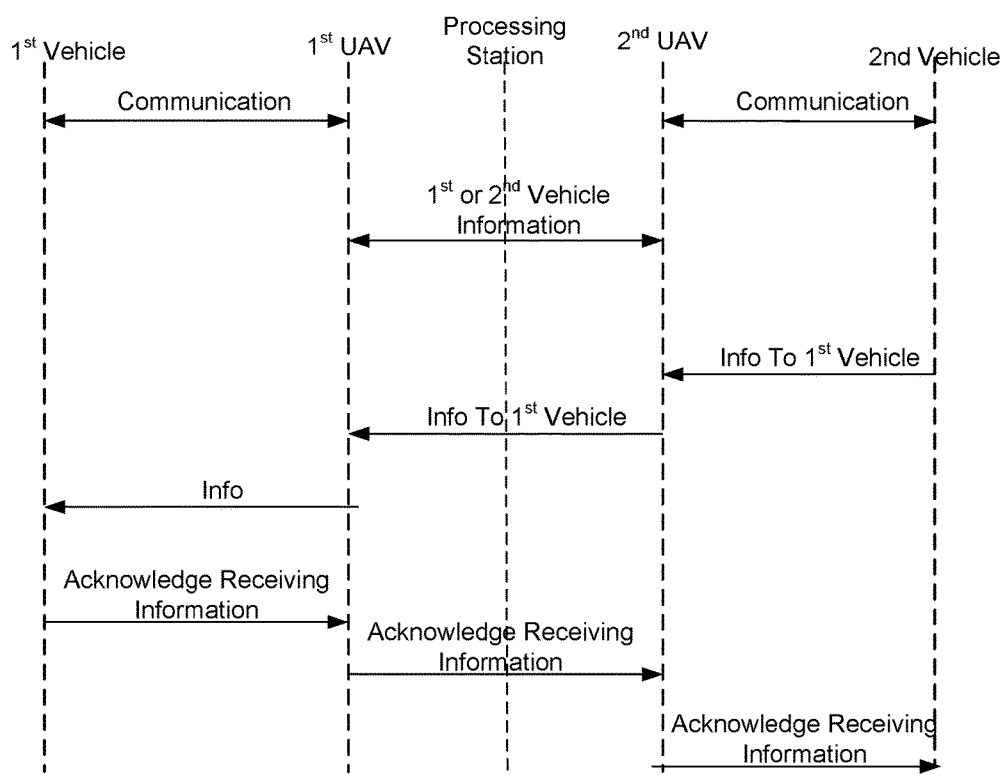
FIG. 5 illustrates an example of a communication protocol between two vehicles via respective UAVs.

FIG. 5 illustrates an example of a communication protocol between two vehicles 106 via respective UAVs 102. As shown, in certain implementations, a first UAV 102 can be configured to communicate with a first vehicle 106 and a second UAV 102 can be configured to communicate with a second vehicle 102. Those communications can be facilitated by the communication protocols shown in FIGS. 3-4. As also shown, the first or second vehicle 106 can be communicate with each other via the first and second UAVs 102. The first and second UAVs 102 may forward the information communicated between the first and second vehicles either directly to each other or via a processing station 110 as shown. The communications between UAVs 102 and/or the processing stations 110 are illustrated in FIG. 4.

Figure 6:
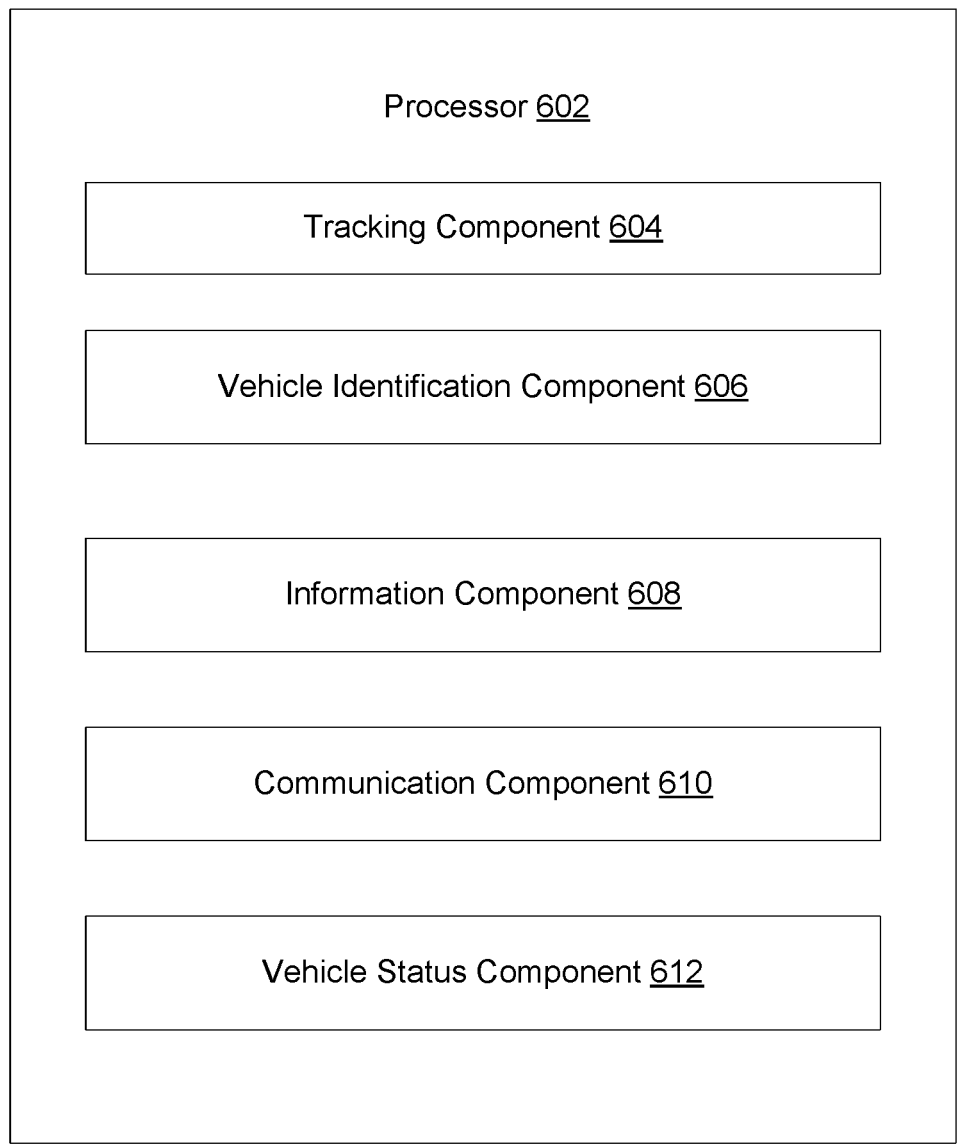
FIG. 6 illustrates an example of a device for facilitating communication with a given vehicle in accordance with the disclosure.

FIG. 6 illustrates an example of a device 600 for facilitating communication with a given vehicle 106 in accordance with the disclosure. In certain embodiments, device 600 can be provided in a UAV 102. For example, the device 600 can be part of the payload carried by UAV 102. In any case, as shown, device 600 can include one or more of a processor 602 configured to implement programmed components. The programmed components can include a tracking component 604, a vehicle identification component 606, a vehicle information component 608, a communication component 610, a vehicle status component 612 and/or any other components.

The tracking component 604 can be configured to manage UAVs 102 in the network 102. In implementations, the tracking component 604 can instruct generation of tracking signals and direct the tracking signals to be transmitted. The tracking signals can be in various forms. For example, the tracking component 604 may be configured to scan a covered area 104 with a camera aboard UAV 102 in a pre-determined pattern configured into the tracking component 604. For example, the tracking component 604 may be configured to scan the covered area 104 in a scan line fashion from on one corner of the covered area 104 to the opposite corner of the covered area 104. As another example, the tracking component 604 may be configured to scan the covered area 104 in a concentric sphere fashion starting from an outer sphere within the covered area 104, gradually into inner spheres within the covered area 104 until the center of the covered area 104. Still as another example, the tracking component 604 may be configured to scan the covered area along predefined lines of areas 104, for example a portion of a road that enters area 104 and another portion of the road that exits area 104.

The vehicle identification component 606 can be configured to instruct capturing of an identification of the vehicle 106 after the vehicle 106 has been tracked by the tracking component 604. In certain implementations, vehicle identification component 606 can instruct a camera aboard the UAV 102 to capture the identification of the vehicle 106. For example, vehicle identification component 606 may be configured to instruct the camera to capture a picture of a license plate of vehicle 106 once it has been tracked and transmit the image to a profile server to identify the vehicle 106. As another example, the vehicle identification component 606 may be configured to identify the vehicle 106 by transmitting a request to vehicle 106 to inquire about its identification, and the vehicle 106 can send its identification to the UAV 102 in response to the request.

The information component 608 can be configured to obtain information regarding vehicle 106. In implementations, once the identification of vehicle 106 has been captured by vehicle identification component 606, the information component 608 can obtain information regarding the vehicle 106, for example, from the profile server via the processing station 110 as shown in FIG. 2C. For instance, the information component 608 can transmit the identification of the vehicle 106 to the profile server and the profile server can look the vehicle 106 up based on identification received. The profile server, in that example, can provide the vehicle information regarding the vehicle 106 to information component 608 once it finds a match. The information regarding vehicle 106 can include information regarding communication capability of vehicle 106, such as one or more communication hardware carried by the vehicle. The information regarding vehicle 106 can include information indicating a model, type, make, and/or any other information regarding a type of the vehicle 106. Such information may be used to by UAV 102 to assist its communication with vehicle 106.

The communication component 610 can be configured to establish a communication link between the UAV 102 and vehicle 106, error control the communication between the UAV 102 and vehicle 106, manage communication status, and/or any other operations. In certain embodiments, the communication component 610 can be configured to implement the communication protocols illustrated in FIGS. 3-5.

The vehicle status component 612 can be configured to obtain a status from an individual vehicle 106. Examples of the statuses that can be obtained by the vehicle status component 612 can include a status indicating a load of vehicle 106 (e.g., 50% busy, 80% processing power is used and so on), a status indicating vehicle 106 is available to receive any information, and/or any other statuses.

Figure 7:
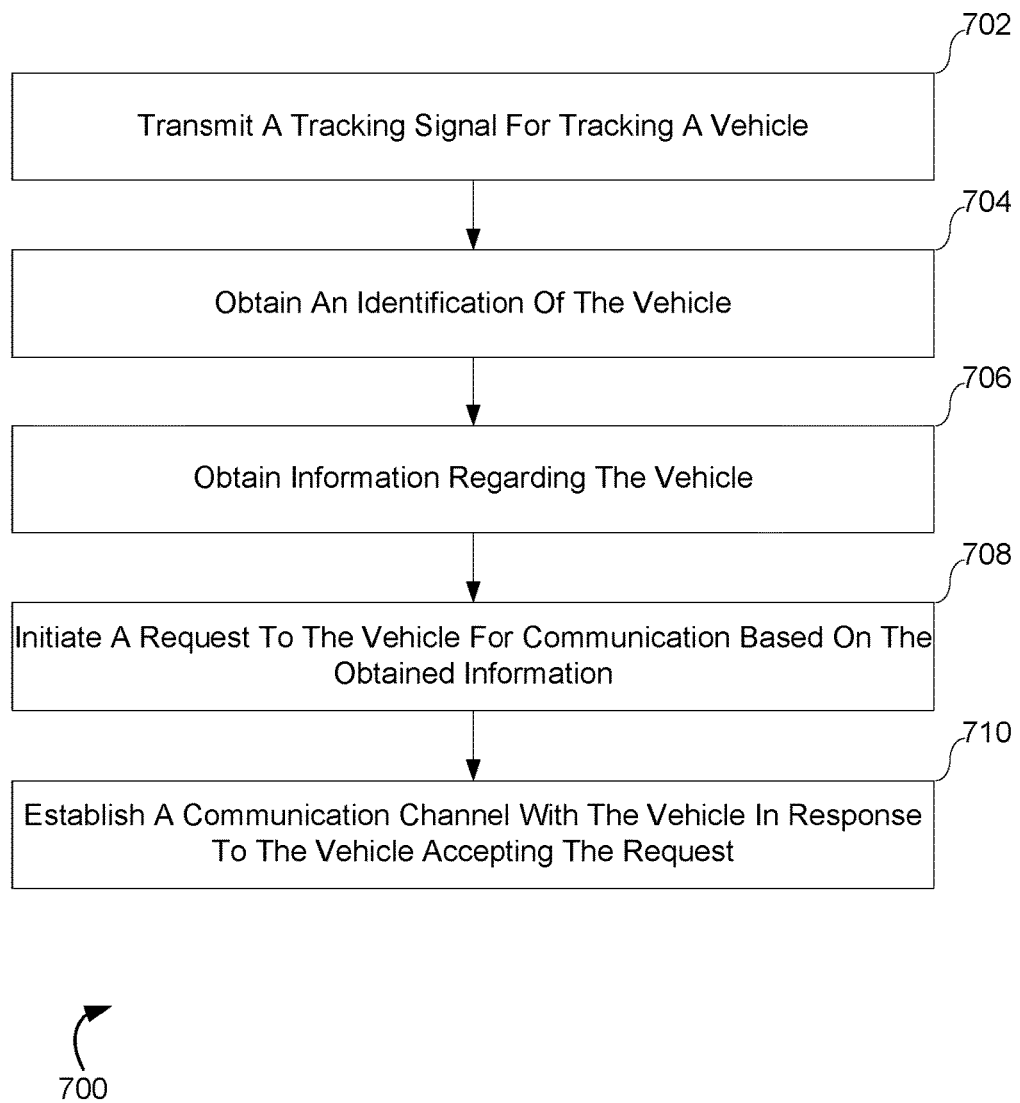
FIG. 7 illustrates one exemplary method for facilitating communication with a vehicle via a UAV in accordance with the disclosure.

FIG. 7 illustrates one exemplary method for facilitating a UAV network in accordance with the disclosure. The operations of method 700 presented below are intended to be illustrative. In some embodiments, method 700 may be accomplished with one or more additional operations not described and/or without one or more of the operations discussed. Additionally, the order in which the operations of method 700 are illustrated in FIG. 7 and described below is not intended to be limiting.

In some embodiments, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At 702, a tracking signal can be transmitted from a UAV. The control signal received at 702 can indicate a location of a second UAV. The tracking signal can be in various forms. For example, the UAV 102 may scan the covered area 104 with a camera aboard UAV 102 in a pre-determined pattern. For example, the UAV 102 may scan the covered area 104 in a scan line fashion from on one corner of the covered area 104 to the opposite corner of the covered area 104. As another example, the UAV 102 may scan the covered area 104 in a concentric sphere fashion starting from an outer sphere within the covered area 104, gradually into inner spheres within the covered area 104 until the center of the covered area 104. Still as another example, the UAV 102 may scan the covered area along predefined lines of areas 104, for example a portion of a road that enters area 104 and another portion of the road that exits area 104. In certain embodiments, the UAV 102 may carry a radio transmitter configured to broadcast in radio signals within the covered area 104. In some implementations, operation 702 can be performed by tracking component the same as or substantially similar to tracking component 604 described and illustrated herein.

At 704, an identification of the vehicle tracked at 702 can be obtained. In certain implementations, the identification of the vehicle can be obtained by a camera carried by the UAV 102. For example, the UAV may be configured to capture a picture of a license plate of vehicle once it has been tracked. As another example, the UAV may be configured to transmit a request to vehicle to inquire about its identification, and the vehicle can send its identification to the UAV in response to the request. In some implementations, operation 704 can be performed by a vehicle identification component the same as or substantially similar to vehicle identification component 606 described and illustrated herein.

At 706, information regarding the vehicle identified at 704 can be obtained. In certain implementations, once the identification of vehicle is obtained by UAV 102 at 704, the UAV can obtain information regarding the vehicle, for example, from the profile server via the processing station as shown in FIG. 2C. For instance, the UAV can transmit the identification of the vehicle to the profile server and the profile server can look the vehicle up based on identification received. The profile server, in that example, can provide the vehicle information regarding the vehicle to UAV once it finds a match. The information regarding vehicle can include information regarding communication capability of vehicle, such as one or more communication hardware carried by the vehicle. The information regarding vehicle can include information indicating a model, type, make, and/or any other information regarding a type of the vehicle. Such information may be used to by UAV to assist its communication with vehicle 106. In some implementations, operation 706 can be performed by an information component the same as or substantially similar to information component 606 described and illustrated herein.

At 708, a request to establish a communication with the vehicle can be initiated from the UAV based on the information obtained at 706. For example, the UAV can send a handshake message to vehicle via the FSO units 202a and 202b shown FIG. 2 to request the vehicle to establish a communication channel between vehicle and UAV. In certain implementations, UAV 102 can include checksums in the handshake message. In some implementations, operation 708 can be performed by a communication component the same as or substantially similar to communication component 608 described and illustrated herein.

At 710, a communication channel can be established between the vehicle and UAV. In some implementations, operation 710 can be performed by a communication component the same as or substantially similar to communication component 608 described and illustrated herein.

Figure 8:
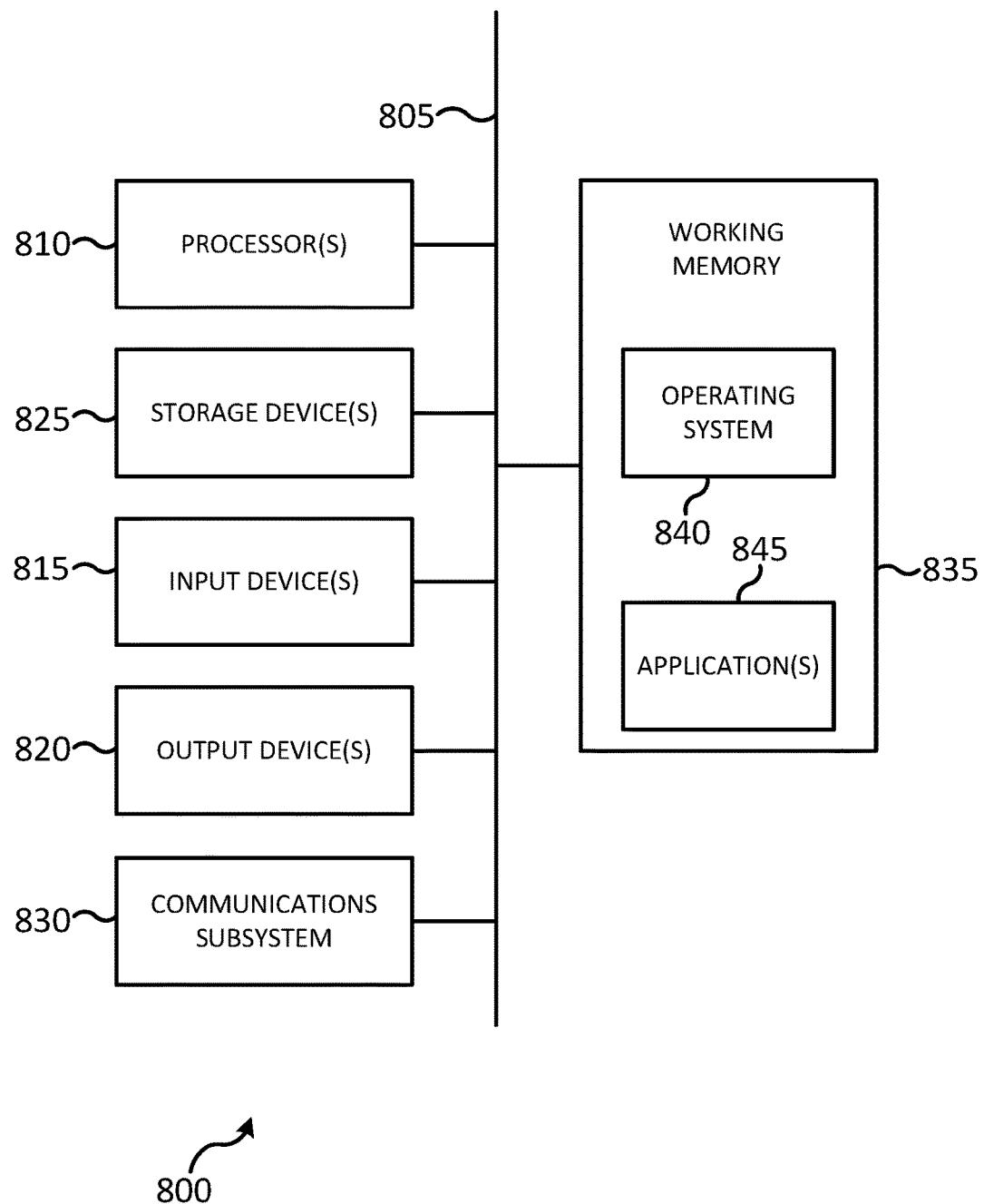
FIG. 8 illustrates a simplified computer system, according to an exemplary embodiment of the present disclosure.

FIG. 8 illustrates a simplified computer system, according to an exemplary embodiment of the present disclosure. A computer system 800 as illustrated in FIG. 8 may be incorporated into devices such as a portable electronic device, mobile phone, or other device as described herein. FIG. 8 provides a schematic illustration of one embodiment of a computer system 800 that can perform some or all of the steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805, or may otherwise be in communication, as appropriate. The hardware elements may include one or more processors 810, including without limitation one or more general-purpose processors and/or one or more special-purpose processors such as digital signal processing chips, graphics acceleration processors, and/or the like; one or more input devices 815, which can include without limitation a mouse, a keyboard, a camera, and/or the like; and one or more output devices 820, which can include without limitation a display device, a printer, and/or the like.

The computer system 800 may further include and/or be in communication with one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 830 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 830. In other embodiments, a portable electronic device, e.g. the first electronic device, may be incorporated into the computer system 800, e.g., an electronic device as an input device 815. In some embodiments, the computer system 800 will further comprise a working memory 835, which can include a RAM or ROM device, as described above.

The computer system 800 also can include software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 8, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 825 described above. In some cases, the storage medium might be incorporated within a computer system, such as computer system 800. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 800 to perform methods in accordance with various embodiments of the technology. According to a set of embodiments, some or all of the procedures of such methods are performed by the computer system 800 in response to processor 810 executing one or more sequences of one or more instructions, which might be incorporated into the operating system 840 and/or other code, such as an application program 845, contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 and/or components thereof generally will receive signals, and the bus 805 then might carry the signals and/or the data, instructions, etc. carried by the signals to the working memory 835, from which the processor(s) 810 retrieves and executes the instructions. The instructions received by the working memory 835 may optionally be stored on a non-transitory storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:
1. A method for facilitating communication between two vehicles via unmanned aerial vehicles (UAV), the method being implemented in one or more of a processor configured to execute programmed components, the method comprising:
  receiving from a first vehicle a communication request to communicate with a second vehicle;
  transmitting the communication request to the second vehicle via a UAV;

receiving information from the second vehicle for communication with the first vehicle;

forwarding the information to the UAV;

obtaining, at the UAV, an identification of the first vehicle;

obtaining, at the first UAV, information regarding the first vehicle using the identification of the first vehicle; and base on the information regarding the first vehicle, establishing a communication channel with the first vehicle, wherein the establishing includes initiating, at the UAV, a request to the first vehicle requesting the vehicle to accept communications from the UAV.

2. The method of claim 1, further comprising tracking, at the UAV, the first vehicle using a scan line tracking pattern for an area covered by the UAV.

3. The method of claim 1, wherein obtaining the identification of the first vehicle includes capturing an image of the first vehicle using a camera aboard the UAV.

4. The method of claim 1, wherein obtaining the identification of the first vehicle includes acquiring the identification from a server operative connected to the UAV.

5. The method of claim 1, wherein the information regarding the first vehicle includes communication hardware information specifying one or more communication components of the first vehicle.

6. The method of claim 1, wherein the information regarding the first vehicle is obtained from a server operatively connected to the first vehicle.

7. The method of claim 1, wherein establishing the communication channel with the first vehicle further includes error controlling, at the UAV, the communication channel.

8. The method of claim 7, wherein the error controlling includes embedded checksum information in data packets transmitted to the vehicle.

9. The method of claim 7, wherein the error controlling includes receiving an acknowledgement message from the first vehicle indicating that a data packet transmitted to vehicle has been received by the first vehicle without error.

10. A system for facilitating communication between two vehicles via unmanned aerial vehicles (UAV), the system comprising one or more processors configured by machine readable-instructions to perform:

receiving from a first vehicle a communication request to communicate with a second vehicle;

transmitting the communication request to the second vehicle via a UAV;

receiving information from the second vehicle for communication with the first vehicle;

forwarding the information to the UAV;

obtaining, at the UAV, an identification of the first vehicle;

obtaining, at the first UAV, information regarding the first vehicle using the identification of the first vehicle; and base on the information regarding the first vehicle, establishing a communication channel with the first vehicle, wherein the establishing includes initiating, at the UAV, a request to the first vehicle requesting the vehicle to accept communications from the UAV.

11. The system of claim 10, further comprising tracking, at the UAV, the first vehicle using a scan line tracking pattern for an area covered by the UAV.

12. The system of claim 10, wherein obtaining the identification of the first vehicle includes capturing an image of the first vehicle using a camera aboard the UAV.

13. The system of claim 10, wherein obtaining the identification of the first vehicle includes acquiring the identification from a server operative connected to the UAV.

14. The system of claim 10, wherein the information regarding the first vehicle includes communication hardware information specifying one or more communication components of the first vehicle.

15. The system of claim 10, wherein the information regarding the first vehicle is obtained from a server operatively connected to the first vehicle.

16. The system of claim 10, wherein establishing the communication channel with the first vehicle further includes error controlling, at the UAV, the communication channel.

17. The system of claim 16, wherein the error controlling includes embedded checksum information in data packets transmitted to the vehicle.

18. The system of claim 17, wherein the error controlling includes receiving an acknowledgement message from the first vehicle indicating that a data packet transmitted to vehicle has been received by the first vehicle without error.

* * * * *